(12) United States Patent
Greenawalt

(10) Patent No.: US 11,333,645 B2
(45) Date of Patent: May 17, 2022

(54) COLORIMETRIC DETECTION OF FLUORIDE IN AN AQUEOUS SAMPLE

(71) Applicant: Hach Company, Loveland, CO (US)

(72) Inventor: Angella Nicholle Greenawalt, Fort Collins, CO (US)

(73) Assignee: HACH COMPANY, Loveland, CO (US)

( * ) Notice: Subject to any disclaimer, the term of this patent is extended or adjusted under 35 U.S.C. 154(b) by 320 days.

(21) Appl. No.: 16/387,191

(22) Filed: Apr. 17, 2019

(65) Prior Publication Data

US 2020/0333304 A1    Oct. 22, 2020

(51) Int. Cl.
    *G01N 31/22*    (2006.01)
(52) U.S. Cl.
    CPC .................................. *G01N 31/22* (2013.01)
(58) Field of Classification Search
    CPC ......................................................... G01N 31/22
    See application file for complete search history.

(56) References Cited

FOREIGN PATENT DOCUMENTS

JP        S6366466 A        3/1988
JP        2015078961 A   *  4/2015

OTHER PUBLICATIONS

Macnulty et al. ["The determination of microgram quantities of fluoride: The use of the aluminium-chromeazurol-s complex." Analytics Chimica Acta 14 (1956): 452-456] (Year: 1956).*

Method 9214 [Potentiometric Determination of Fluoride in Aqueous Samples with Ion-Selective Electrode, 1996]; https://www.epa.gov/sites/production/files/2015-12/documents/9214.pdf (Year: 1996).*

Silverman et al. "Spectrophotometric determination of beryllium and fluoride using chrome azurol S." Analytical Chemistry 31.1 (1959): 152-155] (Year: 1959).*

International Searching Authority, Notification of Transmittal of the International Search Report and the Written Opinion of the International Searching Authority, or the Declaration, dated Jul. 10, 2020, pp. 11.

Macnulty B J et al: The determination of microgram quantities of fluoride11, Analytica Chimica Acta, Els ev i er, Amsterdam, NL, vol. 14, Jan. 1, 1956 (Jan. 1, 1956), pp. 368-380.

Macnulty B J et al: The determination of microgram quantities of fluoride11, Analytica Chimica Acta, Elsevier, Amsterdam, NL, vol. 14, Jan. 1, 1956 (Jan. 1, 1956), pp. 452-456.

Thatcher L L et al, "Water Analysis", Analytical Chemistry, vol. 31, No. 4, Apr. 1, 1959 (Apr. 1, 1959), pp. 776-789, XP001339159, Section: Fluoride; p. 782.

* cited by examiner

*Primary Examiner* — Jennifer Wecker
*Assistant Examiner* — Oyeleye Alexander Alabi
(74) *Attorney, Agent, or Firm* — Ference & Associates LLC

(57) ABSTRACT

An embodiment provides A method for measuring fluoride concentration in an aqueous solution, including: preparing a metal-ligand complex, wherein the metal-ligand complex comprises chromeazurol S and aluminum; placing the metal-ligand complex in a sample containing fluoride, wherein the placing generates a color change by releasing the chromeazurol S from the metal-ligand complex; and measuring, using colorimetric techniques, a concentration of fluoride within the sample, wherein the measuring comprises measuring an absorbance wavelength of a colorimetric ligand. Other embodiments are described and claimed.

20 Claims, 3 Drawing Sheets

COLORIMETRIC DETECTION OF FLUORIDE IN AN AQUEOUS SAMPLE

FIELD

This application relates generally to water quality testing, and, more particularly, to measurement of fluoride within an aqueous sample.

BACKGROUND

The measurement of fluoride in drinking water is an important task for water treatment facilities. Most municipal water facilities introduce a controlled amount of fluoride into drinking water. One benefit to this introduction of fluoride is that when the fluoride is ingested it slows the rate of tooth enamel demineralization and increases the rate of remineralization. This process reduces the incidence of tooth cavities in the population served by fluoridated water. However, high concentrations of fluoride can be detrimental. For example, if the fluoride concentration is too high, dental fluorosis may occur. Additionally, the facility is wasting resources by the addition of too much fluoride. On the other hand, if the fluoride concentration is too low, the prevention of tooth cavities suffers. Therefore, it is necessary to closely monitor the level of fluoride in drinking water to achieve a desired concentration of fluoride and to ensure compliance with regulations.

There are a number of methods to measure fluoride in drinking water. These include the SPADNS, SPADNS 2, and fluoride ion selective electrode (ISE) techniques. Both SPADNS and SPADNS 2 require the preparation of a blank sample vial, and because the chemistry involves the bleaching of a dye, differing styles of sample preparation and may lead to inaccurate results. The ion selective technique requires the addition of an ionic strength adjustment buffer. The equilibrium time for low levels of fluoride that are not within a linear range may be long. Samples are sensitive to sample movement and temperature when measuring with an ISE, both could lead to inaccurate results.

BRIEF SUMMARY

One embodiment provides a method for measuring fluoride concentration in an aqueous solution, comprising: preparing a metal-ligand complex, wherein the metal-ligand complex comprises chromeazurol S and aluminum; placing the metal-ligand complex in a sample containing fluoride, wherein the placing generates a color change by releasing the chromeazurol S from the metal-ligand complex; and measuring, using colorimetric techniques, a concentration of fluoride within the sample, wherein the measuring comprises measuring an absorbance wavelength of a colorimetric ligand.

Another embodiment provides a device for measuring fluoride concentration in an aqueous solution, comprising: a processor; a memory device that stores instructions executable by the processor to: prepare a metal-ligand complex, wherein the metal-ligand complex comprises chromeazurol S and aluminum; place the metal-ligand complex in a sample containing fluoride, wherein the placing generates a color change by releasing the chromeazurol S from the metal-ligand complex; and measure, using colorimetric techniques, a concentration of fluoride within the sample, wherein the measuring comprises measuring an absorbance wavelength of a colorimetric ligand.

A further embodiment provides a device for measuring fluoride concentration in an aqueous solution, comprising: a processor; a memory device that stores instructions executable by the processor to: prepare a metal-ligand complex, wherein the metal-ligand complex comprises chromeazurol S and aluminum; place the metal-ligand complex in a sample containing fluoride, wherein the placing generates a color change by releasing the chromeazurol S from the metal-ligand complex; and measure, using colorimetric techniques, a concentration of fluoride within the sample, wherein the measuring comprises measuring an absorbance wavelength of a colorimetric ligand.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
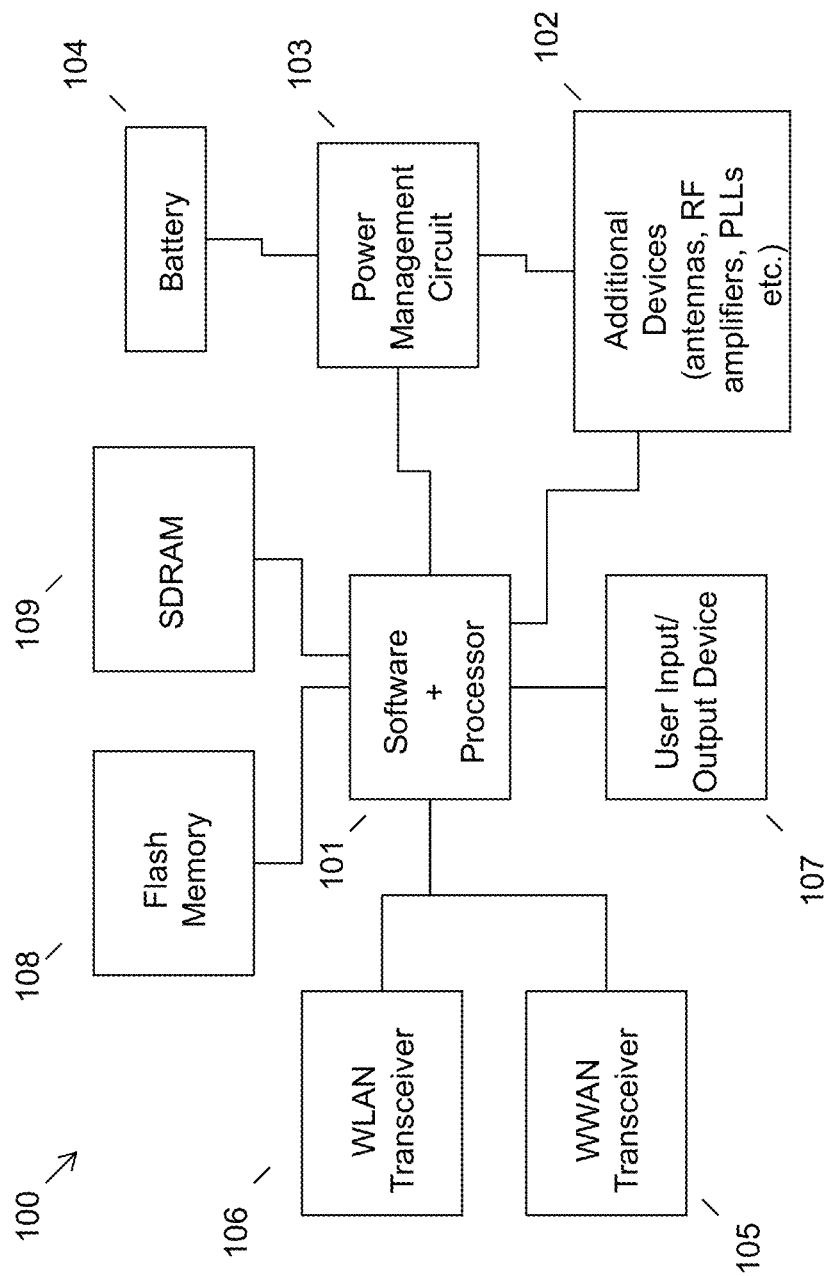
FIG. 1 illustrates an example of computer circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Colorimetric and fluoride ion selective electrode methods are commonly used to measure fluoride levels. A common colorimetric method uses sulfanilic acid azochromotrope, 1,8-Dihydroxy-2-(4-sulfophenylazo)naphthalene-3,6-disulfonic acid trisodium salt, 2-(4-Sulfophenylazo)-1,8-dihydroxy-3,6-naphthalene disulfonic acid trisodium salt, 2-(4-Sulfophenylazo)chromotropic acid trisodium salt, or sodium 1-(parasulphophenylazo)-1,8-dihydroxy-3,6-naphthalene disulfate. These colorimetric methods are based upon the reaction between fluoride and a dark red zirconium dye to form a colorless complex anion. These methods result in a bleaching of the red color in an amount proportional to the fluoride concentration. For example, higher fluoride concentrations react with more of the zirconium dye and the solution turns a lighter color. The resulting color from the colorimetric reaction may be determined photometrically, for example, using a spectrophotometer. The amount of fluoride may be determined by comparison to a similarly prepared blank vial. The absorbance of the sample reacted vial must be compared to the absorbance of the unreacted blank vial to determine the fluoride concentration of the sample reacted vial.

However, the current fluoride testing methods have limitations which are overcome by the methods and techniques as described in more detail herein. One limitation of the current techniques is that they use a bleaching chemistry not favorable to some applications and measurement systems. Additionally, the traditional colorimetric methods require the preparation of a separate "blank" vial. The extra step of preparing a blank vial introduces error to the measurement based upon sample preparation techniques in preparing the blank. Also, since the traditional colorimetric technique involves the bleaching of a dye, the time required for sample preparation and time to measure the sample can introduce variability in the sample reading. Additionally, because the techniques include bleaching of a dye, difficulty may arise because there may not be the same volume of starting colorimetric dye in both the blank and sample vial, thereby introducing error into the determination of the amount of fluoride found in the sample. This error may result in a false positive or false negative result.

The ion selective electrode may also have disadvantages. The ion selective electrode requires the addition of an ionic strength adjustment buffer. Measurements may be affected by the omission of this buffer and it requires an additional preparation step. Also, the equilibrium time for low parts per billion (ppb) levels of fluoride is long and sensitive to both sample movement and temperature, which can in turn, lead to inaccurate results.

Accordingly, an embodiment includes preparation of a metal-ligand complex. The metal-ligand complex may include chromeazurol S and aluminum. Preparation of the metal-ligand complex indicator solution may include a buffer solution. Chromeazurol S may also be referred to as Mordant Blue 29. In an embodiment, the buffer may contain an additive such as a surfactant. The buffer solution may contain acetate, acetic acid, succinic acid, sodium succinate, or the like. The buffer may facilitate the generation of a calibration curve, for example, sodium acetate buffer was used to generate the calibration curve of FIG. 3. However, this is a non-limiting example and other buffer solutions may be used. The buffer may be selected to maintain a pH at, below, or greater than pH 5.0. The buffer may also be selected as to not interfere with an analyte, such as fluoride. In an embodiment, the metal-ligand complex may be placed in an aqueous sample containing fluoride. The delivery method of reagents, for example, the metal-ligand complex, to the aqueous sample, may be accomplished through pipetting, droppers, test strips, powder pillows, using a solid, using a liquid solution, or the like.

In the presence of fluoride within the sample, the aluminum from the metal-ligand complex will be preferentially chelated with the fluoride leaving the colorimetric ligand, chromeazurol S, free in solution. In an embodiment, colorimetric techniques may measure a concentration of the fluoride in the sample based upon the colorimetric ligand. For example, the measuring may be a measurement of an absorbance at a wavelength specific to the ligand. The measuring may include taking a ratio of absorbance collected at multiple wavelengths. The measuring may also include taking a ratio of absorbance of the free ligand versus the metal-ligand complex. Different measurement devices may be used to perform the measurement, for example, a portable parallel analyzer (PPA, such as the SL1000 available from Hach Company, Loveland, Colo.), test strips, colorimetric analyzers, spectrophotometers, pocket colorimeters, online process instruments, and the like.

The illustrated example embodiments will be best understood by reference to the figures. The following description is intended only by way of example, and simply illustrates certain example embodiments.

While various other circuits, circuitry or components may be utilized in information handling devices, with regard to an instrument for fluoride measurement according to any one of the various embodiments described herein, an example is illustrated in FIG. 1. For example, the device circuitry as described in FIG. 1 may be used for communicating measurements to another device or may be used as the device for receiving measurements. Device circuitry 100 may include a measurement system on a chip design found, for example, a particular computing platform (e.g., mobile computing, desktop computing, etc.) Software and processor (s) are combined in a single chip 101. Processors comprise internal arithmetic units, registers, cache memory, busses, I/O ports, etc., as is well known in the art. Internal busses and the like depend on different vendors, but essentially all the peripheral devices (102) may attach to a single chip 101. The circuitry 100 combines the processor, memory control, and I/O controller hub all into a single chip 101. Also, systems 100 of this type do not typically use SATA or PCI or LPC. Common interfaces, for example, include SDIO and I2C.

There are power management chip(s) 103, e.g., a battery management unit, BMU, which manage power as supplied, for example, via a rechargeable battery 104, which may be recharged by a connection to a power source (not shown). In at least one design, a single chip, such as 101, is used to supply BIOS like functionality and DRAM memory.

System 100 typically includes one or more of a WWAN transceiver 105 and a WLAN transceiver 106 for connecting to various networks, such as telecommunications networks and wireless Internet devices, e.g., access points. Additionally, devices 102 are commonly included, e.g., a transmit and receive antenna, oscillators, RF amplifiers, PLLs, etc. System 100 includes input/output devices 107 for data input and display/rendering (e.g., a computing location located away from the single beam system that is easily accessible by a user). System 100 also typically includes various memory devices, for example flash memory 108 and SDRAM 109.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform fluoride measurement of an aqueous sample.

Figure 2:
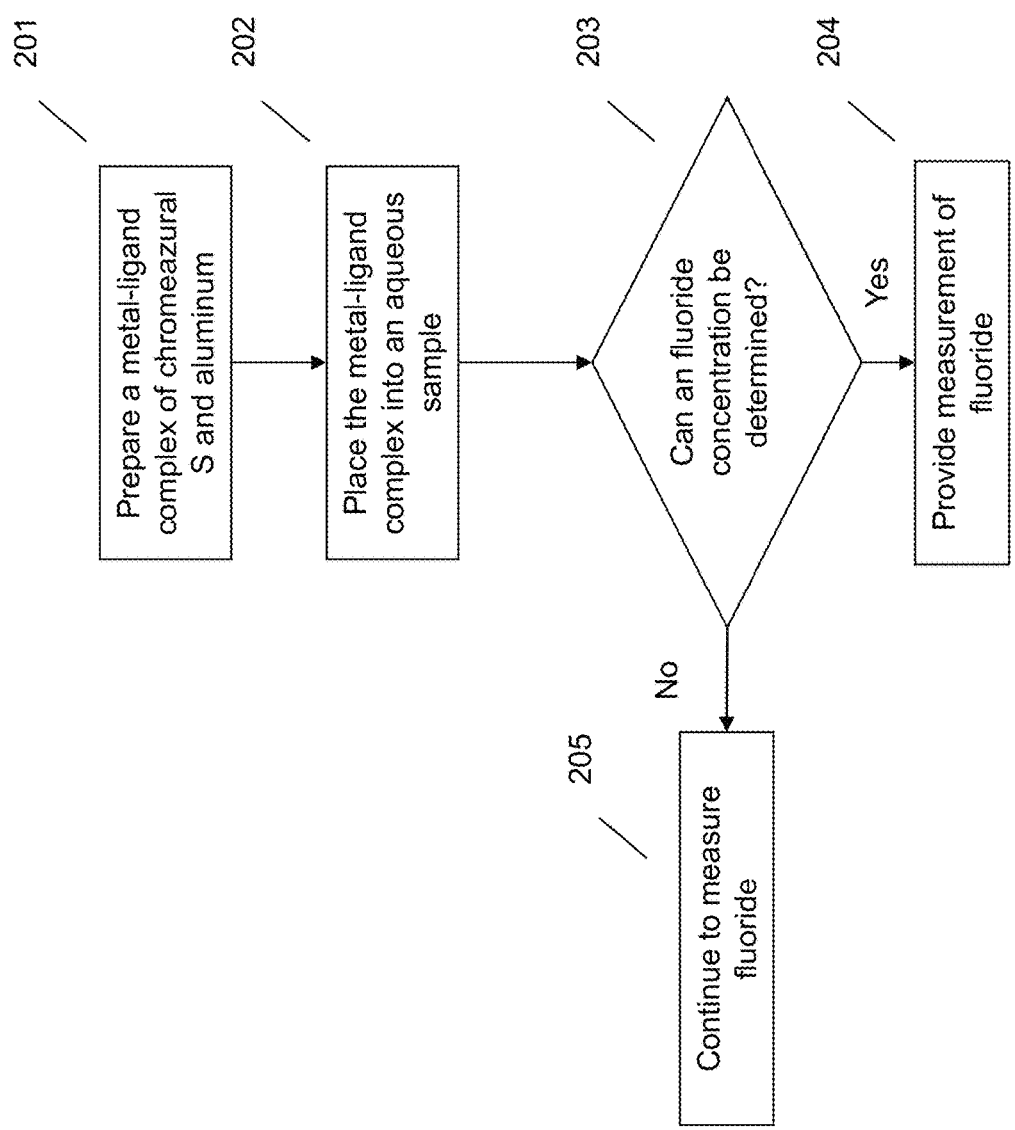
FIG. 2 illustrates an example flow diagram for fluoride detection using a measuring system.

Referring now to FIG. 2, an embodiment provides a measurement of a fluoride concentration in an aqueous environment. In an embodiment, a metal-ligand complex may be prepared. In an embodiment, the metal-ligand complex may include chromeazurol S and aluminum, or a chromeazurol S aluminum complex. Chromeazurol S a colored component, or dye. In an embodiment, the metal-ligand complex may be purified. The metal-ligand complex may be placed in a sample, for example, an aqueous sample, that contains fluoride. The presence of fluoride may displace the aluminum from the metal-ligand complex, thereby releasing the chromeazurol S component. The displacement of aluminum may allow the free colorimetric ligand to exist in solution. The resulting free colorimetric ligand may be used to identify the concentration of fluoride within the sample. For example, using colorimetric techniques, parameters of the colorimetric ligand may be measured. For example, the colorimetric techniques may be used to measure the absorbance of the ligand at one or more wavelengths. The concentration of fluoride may be proportional to an absorbance at a single wavelength, the ratio of absorbance measured at multiple wavelengths, or the like.

At 201, in an embodiment a metal-ligand complex may be prepared. The metal-ligand complex may be formed from chromeazurol S and aluminum. The chromeazurol S may be from a commercial source or synthesized in house. The preparation of the metal-ligand complex may be performed at, below, or greater than pH 5.0. Preparation of the metal-ligand complex may include preparing the metal-ligand complex in a buffer solution. The buffer components of the buffer solution may be selected based upon interaction with fluoride. In other words, the components may be selected in order to reduce interaction with fluoride. Additionally, the buffer components may be selected to chelate with interfering metals or the like, that may be expected within the aqueous sample. In one embodiment, the buffer may contain acetate, or succinic acid. The buffer and/or indicator solution may additionally or alternatively contain an additive. The additive may contain a surfactant or alcohol. The surfactant may produce micelles in the solution. The wavelength maximum may shift as a result. The micelles, and subsequent wavelength shift, may be selected to utilize either an apparatus or condition that may require a shift in absorbance wavelength. For example, if a measurement device is tuned for a particular absorbance wavelength measurement, the surfactant may be added in order to produce a reaction that will result in an absorbance measurement that can be measured by the device.

At 202, the metal-ligand complex may be placed into a sample, for example, an aqueous sample. In an embodiment, the aqueous sample may include fluoride. As an example, a user may want to measure a fluoride concentration in a natural water source (e.g., pond, lake, stream, etc.), in a residential water source (e.g., swimming pool, residential water supply, etc.), commercial or municipal water source (e.g., water treatment facility, water holding tank, facility water supply, laboratory sample, etc.), or the like. Thus, the metal-ligand complex may be placed or otherwise introduced to the aqueous sample. Different techniques for introducing the metal-ligand complex to the aqueous sample may be utilized. For example, the aqueous sample may be placed in a vial, measurement device, vessel, or the like, and then the metal-ligand complex may be introduced to the sample, for example, through use of a dropper, pipette, powder pillow, test strip, or the like. Alternatively, the metal-ligand complex may be placed in a vial, measurement device, vessel, or the like, and the sample may thereafter be introduced to the aqueous sample.

The sample may contain fluoride. The fluoride may be in a pure or compound form. Additionally or alternatively, the fluoride may be in a liquid form or a finely suspended form in the aqueous sample. In an embodiment, the fluoride sample and/or metal-ligand complex may be added to a reaction vessel or other chamber of a measurement device. The introduction of the fluoride sample and/or metal-ligand complex may be automated or manual. For example, a sample for testing may be pumped, aliquoted, pipetted, or introduced in any manner into a vessel or device. The fluoride-containing sample for testing may be from any number of sources, for example, the fluoride may be from municipal water, drinking water, surface water, wastewater, industrial effluent, a natural waterway, a manufacturing process, swimming pool, or the like. The method and system may have more than one reaction vessel. For example, a fluoride sample may be introduced into a first vessel and subsequent steps of an embodiment may occur in another vessel or vessels. For example, the sample may be introduced into a first vessel or chamber, the indicator solution may be introduced into a second vessel or chamber, and then the fluoride sample and metal-ligand complex may be mixed into a third vessel or chamber.

A chamber, vessel, cell, or the like, may contain an aqueous sample, metal-ligand complex, buffer, and associated reagents. A device may contain one or more bottles of reagents which contain necessary reagents such as, but not limited to, metal-ligand complex, buffers, or any reagent that may not be premixed before the measuring process. The regents contained in the one or more bottles may be pump fed or gravity fed. The flow of the reagents may be metered to ensure proper volume delivery to the measurement cell. The aqueous sample may be fed through a pressured inlet, a vessel, or the like. The aqueous sample may be introduced into the measurement chamber by a pump or gravity fed. The sampling device may be in series or parallel to an aqueous flow. The device may have a system to ensure proper mixing of the aqueous sample, metal-ligand complex, and related reagents.

The aqueous sample may include a sample from a natural body of water, a holding tank, a processing tank, a pipe, or the like. The fluoride-containing sample may be in a continuous flow, a standing volume of liquid, or any combination thereof. In one embodiment, the fluoride-containing sample may be introduced to a vessel, for example, a test chamber of the measurement device. Introduction of the fluoride-containing sample into the measurement device may include placing or introducing the fluoride-containing sample into a test chamber manually by a user or using a mechanical means, for example, gravity flow, a pump, pressure, fluid flow, or the like. For example, a water sample for fluoride testing may be introduced to a measurement or test chamber using a pump. In an embodiment, valves or the like may control the influx and efflux of the aqueous solution into or out of the one or more chambers, if present. In an embodiment, pumps, valves, and piping may control and direct the flow of reagents, for example, the indicator solution. In an embodiment, these systems may be automated or controlled by a processor.

Additionally or alternatively, the measurement device may be present within or introduced into a volume of the fluoride-containing sample. The measurement device is then exposed to the volume of aqueous sample where it can perform measurements. For example, a handheld measurement device may include a test strip, test chip (such as a Chemkey® available from Hach Company, Loveland, Colo.), or the like, that allows for dipping of the device or a portion of the device within the aqueous sample that then pulls a portion of the aqueous sample into the measurement device. As another example, the measurement device may be located within or in proximity to a water source or sample source and may periodically pull a sample for measurement. The system may be a flow-through system in which fluoride-containing sample and/or reagents are automatically mixed and measured. Once the sample is in contact with the measurement system, the system may measure the fluoride in the sample using colorimetric techniques. In an embodiment, the measurement device may include one or more chambers in which the one or more method steps may be performed.

The fluoride concentration measurement may occur when a trigger is received from a user, for example, a user indicates that a measurement should be taken to a device that can automatically pull and take a measurement, when a user introduces a sample to a measurement device, or the like. Alternatively or additionally, fluoride concentration measurement may be at periodic intervals set by the user or preprogrammed frequencies in the device. Measurement of fluoride by a device allows for real time data with very little human involvement in the measurement process. Cleaning of the colorimetric chamber may be required at an unspecified time interval. A programmed calibration curve may be entered into the device.

At 203, in an embodiment, the system may determine whether a concentration of fluoride within the sample can be determined or measured. To make this determination the system may attempt to measure a concentration of fluoride in the sample, for example, using one or more colorimetric techniques. In an embodiment, the metal-ligand complex may act as a colorimetric indicator once aluminum has been removed from the complex. In an embodiment, the aluminum in the metal-ligand complex reacts with fluoride in the sample and releases a colorimetric ligand.

In an embodiment, when the metal-ligand complex is introduced to the sample containing fluoride, the aluminum is displaced from the metal-ligand complex, thereby releasing the chromeazurol S component. In other words, the aluminum preferentially chelates with fluoride. After introduction of the metal-ligand complex to the sample, the sample containing the metal-ligand complex may be gently warmed. This may assist in releasing the aluminum from the metal-ligand complex. The free colorimetric ligand results in a color change in the sample. The color change has a relationship (e.g., proportional, inversely proportional, etc.) to the amount of fluoride in the sample.

The colorimetric indicator may be water soluble. The colorimetric indicator may be chromeazurol S. The indicator may give a visual indication of fluoride concentration, which may be determined via absorbance measurements made using a laboratory apparatus or other measurement device. The resulting color or absorbance change from the interaction of the indicator with the fluoride in the sample may be determined photometrically, for example, using a spectrophotometer. For example, the measurement device may measure the absorbance wavelength of the colorimetric ligand. In an embodiment, a ration of the metal-ligand absorbance and the free ligand absorbance may be measure. The ration may be used to obtain an internal reference. This absorbance wavelength may be proportional to a concentration of fluoride within the sample. Thus, by identifying the absorbance wavelength, the system can measure the concentration of fluoride in the sample. In one embodiment, two or more absorbance wavelengths may be measured. The fluoride concentration may then be proportional to the ratio of the multiple absorbance wavelengths. The absorbance intensity of the free chromeazurol S can also be monitored and used as an internal reference.

The change in absorption may be measured using a spectrophotometer. Spectrophotometry is measurement of reflection or transmission properties of a sample measured at a given wavelength or set of wavelengths. Spectrophotometry may be a quantitative measure of how much light is absorbed by a material, for example, the colorimetric ligand resulting from the interaction of chromeazurol S and fluoride. For example, metal-ligand complex may have an absorbance maximum around 548 nm, but with aluminum displaced the chromeazurol S in solution may be yellow/orange in color (427 nm). The change in absorption may also be measured using other colorimetric measurement devices.

The concentration of fluoride may be determined in many ways. For example, comparison of a known concentration of fluoride with the colorimetric ligand, the chromeazurol S, or absorbance wavelengths may be used to create a calibration curve of known fluoride concentrations. As another example, the absorbance of a sample containing fluoride may be determined using a set of known concentration fluoride samples to generate a calibration curve. The absorbance wavelengths of the resulting colorimetric ligand may also be compared to a "blank" to determine the concentration of fluoride within the sample.

Figure 3:
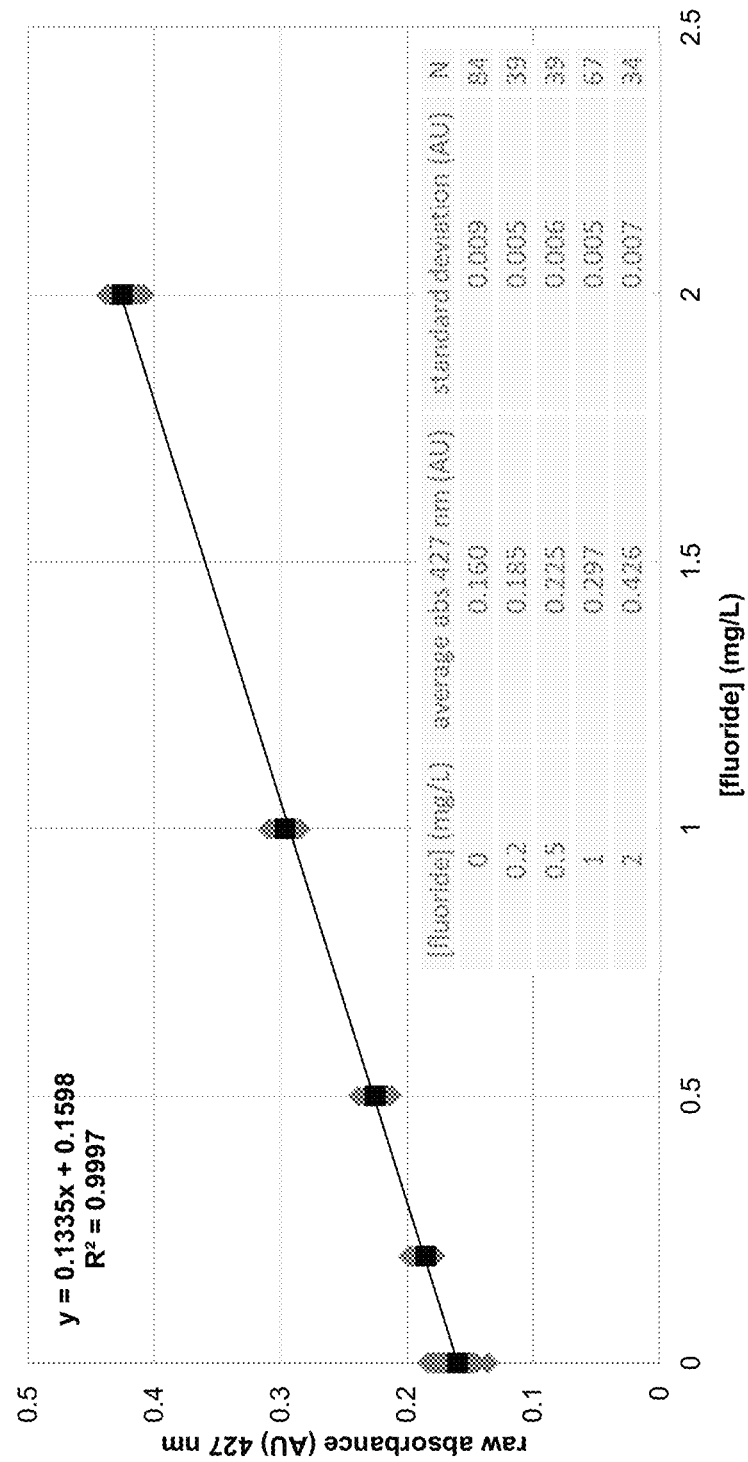
FIG. 3 illustrates an example dose-response curve of fluoride detection using a colorimetric technique.

Referring to FIG. 3, an example embodiment of determining a fluoride concentration within a sample using a colorimetric technique is illustrated. The described system or method may determine whether a colorimetric change occurred within the sample. Specifically, a colorimetric change may occur in the solution due to the existence of an fluoride concentration in the solution. In an embodiment, a ratio of absorbance may be taken. For example, a spectrophotometer may obtain absorbance at two wavelengths. For example, the two absorbance wavelengths may be 548 nm and 427 nm. A ratio of the absorbance at these two wavelengths may be proportional to the fluoride concentration within the sample. Thus, the system may determine the fluoride concentration based upon the two wavelengths.

The determination may also be made based upon a predicted absorbance under known conditions. Predictions may be based upon variables such as temperature, pH, turbidity, path length, instrumentation, or the like. For example, the system may be programmed with a calibration curve. Deviations from the predicted curve may make results less reliable and cause the system to discontinue measuring or to send an alert. As another example, the system may receive information indicating a number of measurement cycles measuring fluoride concentration are outside acceptable limits. For example, such measurements may indicate that a step in the process may be suboptimal. Such steps may include, but are not limited to, indicator concentration, pH, temperature, or the like.

At 205, in an embodiment, if a concentration of fluoride cannot be determined, the system may continue to measure fluoride, obtain another sample, or the like. Additionally or alternatively, the system may output an alarm, log an event, or the like. If the concentration of fluoride can be determined at 203, the system may provide, at 204, the measurement of the fluoride concentration.

The fluoride measurement may be an output upon a device in the form of a display, printing, storage, audio, haptic feedback, or the like. Alternatively or additionally, the output may be sent to another device through wired, wireless, fiber optic, Bluetooth®, near field communication, or the like. An embodiment may use an alarm to warn of a fluoride measurement or concentration outside acceptable levels. An embodiment may use a system to shut down water output or shunt water from sources with unacceptable levels of fluoride. For example, a fluoride measuring device may use a relay coupled to an electrically actuated valve, or the like.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device such as illustrated in FIG. 1, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring fluoride concentration in an aqueous solution, comprising:
   preparing a metal-ligand complex in a buffer solution, wherein the buffer solution comprises succinic acid and a surfactant; wherein the metal-ligand complex comprises chromeazurol S and aluminum;
   placing the metal-ligand complex in a sample containing fluoride,
   wherein the placing generates a color change by removing the aluminum from the complex and releasing the chromeazurol S from the metal-ligand complex, leaving the chromeazurol S free in the solution and forming a free colorimetric ligand, wherein the sample containing fluoride and the interferant comprises an interferant for a fluoride measurement; and
   measuring, using colorimetric techniques, a concentration of fluoride within the sample in the presence of the interferant, wherein the measuring comprises measuring an absorbance wavelength of the free colorimetric ligand.

2. The method of claim 1, further comprising heating the metal-ligand complex and the sample containing fluoride.

3. The method of claim 2, wherein the absorbance value is proportional to the concentration of fluoride within the sample and wherein the measuring comprises determining the concentration of fluoride based upon the proportionality.

4. The method of claim 1, wherein the preparing comprises dissolving the metal-ligand complex in a buffered solution.

5. The method of claim 4, wherein the buffered solution comprises an acetate buffer.

6. The method of claim 4, wherein the dissolving comprises dissolving the metal-ligand complex in a buffered solution at a predetermined pH that prevents interference with other metals.

7. The method of claim 4, wherein the measuring comprises monitoring an absorbance of free chromeazurol S in solution.

8. The method of claim 1, wherein the measuring comprises a ratio of absorbance of the free ligand and an absorbance of the metal-ligand complex.

9. The method of claim 1, wherein the preparing comprises preparing the metal-ligand complex within a measurement device selected from the group consisting of: a powder pillow, a test strip, and a liquid solution.

10. The method of claim 1, wherein the measuring comprises comparing the absorbance wavelength to an absorbance wavelength of a blank.

11. A device for measuring fluoride concentration in an aqueous solution, comprising:
   a processor;
   a memory device that stores instructions executable by the processor to:
   prepare a metal-ligand complex in a buffer solution, wherein the buffer solution comprises succinic acid and a surfactant; wherein the metal-ligand complex comprises chromeazurol S and aluminum;
   placing the metal-ligand complex in a sample containing fluoride,
   wherein the placing generates a color change by removing the aluminum from the complex and releasing the chromeazurol S from the metal-ligand complex, leaving the chromeazurol S free in the solution and forming a free colorimetric ligand, wherein the sample containing fluoride and the interferant comprises an interferant for a fluoride measurement; and measure, using colorimetric techniques, a concentration of fluoride within the sample in the presence of the interferant, wherein the measuring comprises measuring an absorbance wavelength of the free colorimetric ligand.

12. The device of claim 11, further comprising heating the metal-ligand complex and the sample containing fluoride.

13. The device of claim 12, wherein the absorbance value is proportional to the concentration of fluoride within the sample and wherein the measuring comprises determining the concentration of fluoride based upon the proportionality.

14. The device of claim 11, wherein the preparing comprises dissolving the metal-ligand complex in a buffered solution.

15. The device of claim 14, wherein the buffered solution comprises an acetate buffer.

16. The device of claim 14, wherein the dissolving comprises dissolving the metal-ligand complex in a buffered solution at a predetermined pH that prevents interference with other metals.

17. The device of claim 14, wherein the measuring comprises monitoring an absorbance of free chromeazurol S in solution.

18. The device of claim 11, wherein the measuring comprises a ratio of absorbance of the free ligand and an absorbance of the metal-ligand complex.

19. The device of claim 11, wherein the preparing comprises preparing the metal-ligand complex within a measurement device selected from the group consisting of: a powder pillow, a test strip, and a liquid solution.

20. A measurement device for measuring fluoride concentration in an aqueous solution, comprising:
a processor;
a memory device that stores instructions executable by the processor to:
prepare a metal-ligand complex in a buffer solution, wherein the buffer solution comprises succinic acid and a surfactant; wherein the metal-ligand complex comprises chromeazurol S and aluminum;
placing the metal-ligand complex in a sample containing fluoride,
wherein the placing generates a color change by removing the aluminum from the complex and releasing the chromeazurol S from the metal-ligand complex, leaving the chromeazurol S free in the solution and forming a free colorimetric ligand, wherein the sample containing fluoride and the interferant comprises an interferant for a fluoride measurement; and
measure, using colorimetric techniques, a concentration of fluoride within the sample in the presence of the interferant, wherein the measuring comprises measuring an absorbance wavelength of the free colorimetric ligand.

* * * * *